3,649,686
Patented Mar. 14, 1972

3,649,686
CONTINUOUS PROCESS FOR THE PREPARATION OF ACYLSULFANILYL CHLORIDE

Lawrence James Ross, North Plainfield, and Frederick Boyd Van Cor, South Branch, N.J., assignors to American Cyanamid Company, Stamford, Conn.
No Drawing. Filed May 12, 1969, Ser. No. 823,948
Int. Cl. C07c 143/70
U.S. Cl. 260—543 R    7 Claims

ABSTRACT OF THE DISCLOSURE

N-acylsulfanilyl chlorides are obtained from the continuous reaction of an acylanilide and chlorosulfonic acid by adding an organic solvent and a cationic or nonionic surfactant to the reaction mixture after reaction is complete but prior to crystallizing the product. Precipitation of the product is carried out by adding water in stages to the process stream.

---

This invention relates to a continuous process for the preparation of acylsulfanilyl chlorides.

Acylsulfanilyl chlorides, particularly acetylsulfanilyl chloride (ASC), are important intermediate compounds used in the preparation of sulfonamide drugs. It is essential that the products be of a high degree of purity and that they be kept dry since they react with water, particularly at elevated temperatures.

At the present time, acylsulfanilyl chlorides are produced in the form of a slurry in dilute acid media by reacting an acylanilide and chlorosulfonic acid and drowning in water. The solid is obtained by filtering, washing with water and drying. The wet cake obtained contains about 40 to 50% water and appreciable amounts of an acylsulfanilic acid as a contaminant is retained in the dried particulate product. In order to remove the acylsulfanilic acid from the product, expensive purification processes which are now in commercial use are required. While such processes are capable of producing a dry product of high purity, they are undesirable in that they necessitate numerous recrystallizations with considerable loss of yield, and furthermore employ undesirably large amounts of solvent.

Exemplary of the prior art processes is the process described in U.S. Pat. 2,383,128 wherein a water immiscible, inert solvent is first added to an aqueous slurry of ASC to wet the ASC particle surfaces with the solvent rather than with water. The water layer is removed and the remaining slurry is filtered. The wet cake is heated at moderate temperature to drive off the remaining water and solvent and to obtain a dry product. This process is undesirable in that it requires excessive quantities of solvent and does not achieve the required product purity, thus necessitating subsequent stepwise recrystallizations from an organic solvent.

U.S. Pat. 2,996,541 discloses an alternative process for making ASC. To ASC prepared by reacting anhydrous chlorosulfonic acid and acetanilide is added enough water to react with all of the free chlorosulfonic acid to decompose it and evolve HCl. After HCl liberation has ceased, additional water is added in an amount only sufficient to precipitate substantially all the ASC and maintain the reaction by-products including sulfuric acid in solution. An organic solvent for ASC which is immiscible and unreactive with sulfuric acid is added after the water addition step to facilitate product crystal growth, the solvent being utilized in an amount of 10–15% based on the weight of dry ASC obtained. The resultant mixture is aged for a minimum of about 30 minutes to further facilitate product crystal growth while the temperature is maintained in the range of 20–60° C. This process is said to minimize solvent addition. However, this process results in lower product yields without minimizing the acetylsulfanilic acid contaminant in the product. This process also requires stepwise product recrystallization purification procedures.

There exists, therefore, the need for an improved process for preparing acylsulfanilyl chlorides in high yield and purity. Furthermore, it would be highly desirable to provide a process for producing acylsulfanilyl chlorides at high rates and in a manner which reduces solvent requirements. An especially desirable process would be one which permits operating in a continuous manner.

It is an object of this invention to provide a continuous process for making high purity acylsulfanilyl chlorides in high yields.

It has now been discovered that the crude acylsulfanilyl chloride product obtained by reacting an acylanilide and chlorosulfonic acid can be purified in a convenient and effective manner. The acylanilide and chlorosulfonic acid are reacted in the relative molar ratio of 1 to about 3–7, respectively, under conventional reaction conditions to give a crude reaction product containing the desired acylsulfanilyl chloride and chlorosulfonic acid. A solvent and a surfactant are added to the solution prior to crystallizing the product; that is, prior to obtaining a reaction mixture having a sulfuric acid strength less than about 70%. Excess chlorosulfonic acid is converted to sulfuric acid by the addition of water and the sulfuric acid strength is reduced by continuous staged dilutions with water whereby crystallization is effected, care being taken to maintain the temperature in each stage below about 45° C. The solvent and surfactant are added prior to reducing the sulfuric acid strength to 70% or below since crystallization of the product is initiated when the sulfuric acid strength of the reaction mixture is reduced to that level. The crystalline product of high purity is recovered from a solution having a sulfuric acid concentration of about 50% or less, by filtration and drying. Product recovery is completed within a short time, preferably in less than about 15 minutes, after crystallization is initiated. Relatively large crystals can be obtained in short crystallization times. When the crystallization process is carried out continuously over longer periods, the crystals obtained are undesirably small. This is surprising since crystal size usually increases with crystallization time.

The crude acylsulfanilyl chloride is produced by feeding an acylanilide and chlorosulfonic acid into a suitable reactor in the molar ratio of 1 to about 3–7, preferably 1 to 5, respectively. Provision is made for venting and collecting liberated hydrogen chloride as is well known in the art. Although not critical to the present invention, the reaction can be carried out in a single reactor as well as in a plurality of reactors wherein the reaction mixture passes through adjacent reactors arranged in sequence. When employing a plurality of reactors the effluent from the first reactor is passed into a second reactor such as a plugflow reactor, so that the total reaction time in both reactors is about 30 minutes to 2 hours, preferably about 45 to 90 minutes, dependent to some extent upon the reaction temperature. The product is then mixed with solvent, surfactant and water. The addition of these materials can be effected in any sequence so long as the solvent and surfactant are added prior to product crystallization.

In one embodiment, the product can be passed into a dilution stage where it is diluted continuously with water to convert the unreacted chlorosulfonic acid to sulfuric acid, with provision again being made to vent and collect the liberated HCl. In the following description, reference will be made to sulfuric acid strength of the reaction mixture in terms of percentage. A solution which is referred to as 100% acid strength is that resulting from the reaction of all the chlorosulfonic acid to produce sulfuric acid or the product as shown in Equations I and II below and prior to diluting the thus obtained reaction mixture with water. The acid strength of the reaction mixture is reduced by adding water. The amount of water added is that which will convert all of the excess chlorosulfonic acid to sulfuric acid and reduce the concentration of sulfuric acid obtained from the reactions represented by Equations I and II, to between 70% and 100%, and preferably about 80% strength in the first dilution stage.

Equation I

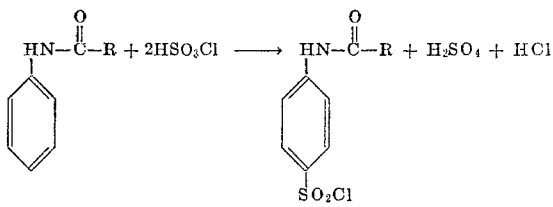

Equation II: $HSO_3Cl + H_2O \rightarrow H_2SO_4 + HCl$

In Equation I, R is alkyl from 1 to 6 carbon atoms. During the addition of water, the reaction mixture is heat-exchanged, if necessary, to maintain the temperature below about 45° C., since water addition produces an exotherm at this point. When the amount of water added is just sufficient to produce a sulfuric acid content of 100%, the exotherm is minor. If water is added to give an acid content below 80%, for example, the exotherm is rather large requiring increased heat exchange capacity. It is preferred to bring the acid strength down to about 80% in this first stage to reduce the evolution of heat in subsequent dilutions. Care must be taken not to dilute the reaction mixture below about 70% strength sulfuric acid prior to adding the solvent and surfactant since the acylsulfanilyl chloride product will crystallize in the absence of the surfactant and solvent which is undesirable. Following the conversion of substantially all the chlorosulfonic acid to sulfuric acid and prior to precipitating the product, the effluent is mixed with a water-immiscible solvent and a surfactant. It is preferred to add solvent and surfactant after substantially all the excess chlorosulfonic acid has been converted to sulfuric acid to minimize the amount of solvent and surfactant loss through entrainment with the evolved HCl and through reaction with chlorosulfonic acid. Water may be added concomitantly so as to obtain a solution having a reduced sulfuric acid strength of less than about 70%. Preferably the first dilution gives an acid strength of 60–70%. The temperature of the mixture is maintained below about 45° C. during this dilution, either by adjusting the rate of water addition to decrease the exotherm, increasing the rate at which the product is removed or by employing a heat exchanger in the dilution stage.

Additional water is then added to the solution having a sulfuric acid strength of 60–70%, to further reduce the acid strength to between about 55 and 60%, preferably 58%. The effluent from the preceding stage overflows into an additional stage wherein water is simultaneously added to reduce the sulfuric acid strength to about 45–55%, preferably 50%. Finally, overflow from the preceding stage is further diluted with water to an acid strength of below 45%, preferably 35%, and this diluted stream is directed to a filter to separate the crystalline product from the remainder of the reaction mixture. All of the dilution, crystallization and separation steps require less than about 15 minutes from the point where crystallization is initiated, at about 70% acid strength, and preferably this time is less than about 10 minutes. Surprisingly, allowing the time to exceed these limits leads to a product with undesirable smaller crystalline size and inferior purity.

It is within the scope of this invention to vary the number of staged dilutions over a reasonable range, such as 3 to 7, without departing from the intended scope of the present invention. Thus, the particular number of stages for achieving the over-all dilution to less than about 50% sulfuric acid may be chosen in accordance with the specific equipment available and its ability to maintain the temperature of the diluted mixture below about 45° C. while allowing dilution to be completed in less than about 15 minutes of the time when the acid content was below 70% (i.e., the beginning of crystallization).

The effluent from the preceding dilution stage may be diluted with water to an acid strength of 45% or below in a single additional stage. Since such a drastic reduction of acid strength would produce a large exotherm, thereby requiring large heat exchange capacity, it is more desirable to stage further dilution by continuously drawing off effluent from the preceding stage and diluting it to a lower acid strength in a separate vessel. This dilution process is repeated in a manner such that the temperature is maintained below 45° C. and the desired acid strength is achieved within less than about 15 minutes.

The amount of solvent employed may vary up to about 25% based on the expected yield of ASC but preferably is in the range of 5–15% on the same basis. Among the solvents that may be employed are aliphatic hydrocarbons such as cyclohexane and petroleum ether; halogenated aliphatic and aromatic hydrocarbons such as ethylene dichloride, trichloroethane, dichloromethane, chlorobenzene and chloroform; and aromatic hydrocarbons such as benzene, toluene, xylene or the like. Ethylene dichloride is preferred.

The surfactant is employed in an amount ranging from about 0.1 to 5.0%, preferably 1.0 to 2.0%, based on the theoretical yield of ASC. Among the surfactants which may be employed are those classified as cationic or nonionic, including such products as the reaction product of stearylamine with 10 moles of ethylene oxide, N,N-di-octadecyl-N,N-dimethylammonium chloride, the reaction product of nonylphenol with 9 moles of ethylene oxide, or the like.

Suitable acylanilides which can be employed are those represented by the formula:

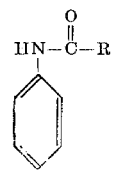

wherein R is alkyl having from 1 to 6 carbon atoms. Representative acylanilides are acetanilide, butyranilide, propanilide and the like.

The invention is more fully illustrated by the examples which follow.

EXAMPLE 1

Acetanilide (2.2 parts/minute) and chlorosulfonic acid (13.3 parts/minute) were added continuously to a stirred reactor. The size of this reactor was chosen to give an average retention time of approximately 16 minutes. The reaction mixture was maintained at approximately 60° C. by external cooling. The hot effluent was removed from the reactor and passed through a plug flow reactor so chosen that the reaction mixture was maintained at 60° C. for approximately an additional 50 minutes.

The effluent from the plug flow reactor was then added to a stream of water in a backmixed stirred tank reactor. The amount of water added formed a solution of approximately 80% sulfuric acid strength containing the dissolved reaction products. The solution temperature was maintained at less than 45° C. by use of a heat exchanger. The hydrogen chloride which evolved from this reactor was combined with that from the first reactor and recovered by suitable scrubbers as an aqueous solution. A solution of a surfactant comprising the reaction product of stearylamine with 10 moles of ethylene oxide in ethylene dichloride solvent was continuously added to the 80% solution which was continuously removed from the back-mixed stirred tank reactor. This solution was diluted to 58% sulfuric acid as it passed into the first stage of a two stage crystallizer, the temperature being maintained below 45° C. by external cooling. The average retention time in this first stage of the crystallizer was less than 3 minutes and crystal formation began. The overflow from the first stage of the crystallizer passed into the second stage and the acid strength was reduced to 50% sulfuric acid by continuous addition of water. The average retention time in the second stage was again less than 3 minutes and crystals continued to form. The overflow from the second stage of the crystallizer was continuously diluted with water to give a 35% sulfuric acid content.

The 35% sulfuric acid effluent was filtered and the solid washed with water, with 5% sodium bicarbonate solution, and with water. After drying with a stream of hot air the product assayed at 98.7% acetylsulfanilyl chloride and it contained 0.56% acetylsulfanilic acid. Yield was about 80% of theory.

The total time required for the dilution with water during the crystallization step was less than about 15 minutes.

The mother liquors from the above filtration were allowed to age under ambient conditions for several days. The solid which precipitated was removed by filtration and washed. There was obtained pure sulfanilic acid, which after drying, assayed 99.9% sulfanilic acid, 0.1% $H_2O$.

EXAMPLE 2

A reaction product obtained from 135 g. (1 mole) of acetanilide and 582.5 g. (5 moles) of chlorosulfonic acid was diluted with 55 ml. of water at 30–35° C. reaction temperature. After liberation of HCl has ceased, 27 ml. of ethylene dichloride was added to the reaction product. 300 ml. of water was then added to the reaction product which was maintained at a temperature in the range of 30–35° C. Acetylsulfanilyl chloride separated as an oil which crystallized after stirring for 15 minutes. The diluted mixture was cooled at 25° C. and filtered. The filter cake was washed with water to a pH of 5. 168 g. of dry product was obtained from 185 g. of wet cake. The product contained about 2.0% of acetylsulfanilic acid as impurity and the yield of real acetylsulfanilyl chloride was 72%.

This example shows that known methods of preparing ASC as disclosed by U.S. Pat. 2,996,541 do not produce a product as of high purity or in as high yields as the present invention as exemplified by Example 1. Furthermore, the process of U.S. Pat. 2,996,541 is handicapped by having to be performed in a batch operation.

EXAMPLE 3

A chlorosulfonation reaction mixture was obtained as in Example 2. It was drowned into about 2 liters of ice water. The product which precipitated was filtered and washed. 300 parts of the product was reslurried in about 1700 parts of water to which was added 2600 parts of toluene. The temperature of the mixture was maintained at 5–10° C. To the diluted material there was then added 1.5 parts of sodium lauryl sulfate in 30 parts of water with thorough stirring. After stirring, the ASC and toluene separated from the water in the form of a soft mass. Stirring was continued and the mixture was then filtered to produce a cake of ASC wet with toluene. This wet cake was then dried for several hours at 70° C. and a product was obtained in 77% yield which contained 95.3% acetylsulfanilyl chloride and 1.21% acetylsulfanilic acid.

This example shows that known methods of preparing ASC as disclosed by U.S. Pat. 2,383,128 do not produce a product of as high purity or in as high yields as the present invention and are further handicapped by having to be performed in a batch operation.

EXAMPLE 4

The procedure of Example 1 was repeated except that the surfactant was eliminated from the ethylene dichloride addition. After completion of the reaction procedure, there was obtained a product which was difficult to dry and assayed at 92.5% acetylsulfanilyl chloride, 0.7% $H_2O$ and 3.5% acetylsulfanilic acid.

This example shows that elimination of the surfactant from the process of the present invention leads to a product of lower purity as compared to the process of this invention employing a surfactant.

EXAMPLE 5

The procedure of Example 1 was repeated except that the ethylene dichloride was omitted. The surfactant was added as an aqueous solution. After completion of the reaction procedure, there was obtained a product which assayed at 95.5% acetylsulfanilyl chloride, 0.08% $H_2O$ and 1.7% acetylsulfanilic acid.

This example shows that elimination of the solvent from the process of the present invention leads to a product of lower purity as compared to the process of this invention which employs a solvent. This example also shows that the use of a combination of surfactant and solvent produces a product of higher purity than can be achieved by the use of either agent alone.

EXAMPLE 6

The procedure of Example 1 was repeated except the solvent and surfactant were added as separate streams, the surfactant being as a 4.4% aqueous solution. After completion of the reaction procedure, there was obtained a product which assayed at 99.3% acetylsulfanilyl chloride, 0.07% $H_2O$ and 0.25% acetylsulfanilic acid.

This example shows that it is not necessary to add the surfactant dissolved in the solvent.

EXAMPLE 7

The procedure of Example 1 was followed in conducting the chlorosulfonation reaction and converting the unreacted chlorosulfonic acid to sulfuric acid, except that in converting the chlorosulfonic acid to sulfuric acid, a sufficient amount of water was added to reduce the sulfuric acid strength to about 77% instead of the 80% of Example 1. Ethylene dichloride in the amount of Example 1, without surfactant, was added to this 77% acid strength solution.

The crystallizer employed in the present example rather than employing the 2 stage crystallizer of Example 1, consisted of a vertically mounted glass tube, ½" x 9", containing four ports along the side, one above the other and numbered sequentially in ascending order beginning with the bottom hole. A four bladed agitator was centered in the tube. The solution as described above was fed into the tube from the first port, the rate of flow being about 25 cc./min. Into the second port, was added an aqueous solution containing 4.4% weight of a surfactant comprising the reaction product of stearylamine with 10 moles of ethylene oxide at a rate sufficient to reduce the sulfuric acid strength to about 65 weight percent. Water was introduced into the third port to reduce the sulfuric acid strength to about 50 weight percent and the slurry was allowed to overflow from the fourth port into a stirred tank into which water was introduced to reduce the sulfuric acid strength to about 35 weight percent. After filtering and drying the product in the usual manner, the ansay was 98.4% acetylsulfanilyl chloride, 0.07% $H_2O$ and 0.88% acetylsulfanilic acid.

This example shows that the solvent and the surfactant need not be added simultaneously to the reaction medium so long as they are both added prior to initiating crystallization.

We claim:
1. A continuous process of isolating an acylsulfanilyl chloride from a reaction mixture obtained from the reaction of an acylanilide and a molar excess of chlorosulfonic acid which comprises:

continuously simultaneously feeding an acylanilide and a molar excess of chlorosulfonic acid under anhydrous conditions to a stirred first reaction zone at a temperature of about 60° C. and thereby reacting the same to form acylsulfanilyl chloride, continuously removing the reaction mixture from said reaction zone and transferring to a second reaction zone, continuously adding water in said second reaction zone in a quantity sufficient to at least convert all excess chlorosulfonic acid to sulfuric acid, but not dilute to below about 80% sulfuric acid, while cooling to below about 45° C.

subsequently adding continuously in a subsequent reaction zone, to the flowing dilute reactant stream, a cationic or non-ionic surfactant and a water immiscible organic solvent which is inert to sulfuric acid, said addition being prior to the formation of crystalline acylsulfanilyl chloride, adding additional water to the resultant mixture, in stages, in subsequent reaction zones, to progressively reduce the sulfuric acid content to below 45% and crystallize the acylsulfanilyl chloride in substantially pure form, said steps of adding water being conducted so as to maintain the temperature of the diluted mixture below about 45° C., and complete product crystallization in less than about 15 minutes.

2. The process of claim 1 wherein acylanilide is acetanilide and the product is acetylsulfanilyl chloride.
3. The process of claim 1 wherein the solvent and the surfactant are added together.
4. The process of claim 3 wherein acylanilide is acetanilide and the product is acetylsulfanilyl chloride.
5. The process of claim 1 wherein the solvent is a halogenated hydrocarbon.
6. The process of claim 2 wherein the solvent is a halogenated hydrocarbon.
7. The process of claim 1 wherein water is added to the crude product containing the solvent and surfactant to bring the sulfuric acid content to about 35% in four additional stages.

References Cited
UNITED STATES PATENTS
3,211,786  10/1965  Mueller _____ 260—543

LORRAINE A. WEINBERGER, Primary Examiner
E. J. GLEIMAN, Assistant Examiner